(12) United States Patent
Haba et al.

(10) Patent No.: US 10,086,651 B2
(45) Date of Patent: Oct. 2, 2018

(54) RUBBER COMPOSITION AND PNEUMATIC TIRE HAVING TREAD FABRICATED USING RUBBER COMPOSITION

(71) Applicant: SUMITOMO RUBBER INDUSTRIES, LTD., Kobe-shi (JP)

(72) Inventors: Toshifumi Haba, Kobe (JP); Koji Fujisawa, Kobe (JP); Gen Higa, Kobe (JP); Satoko Kitamura, Kobe (JP); Takahiro Mabuchi, Kobe (JP); Kazuya Torita, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 15/034,715

(22) PCT Filed: Jul. 29, 2014

(86) PCT No.: PCT/JP2014/069935
§ 371 (c)(1),
(2) Date: May 5, 2016

(87) PCT Pub. No.: WO2015/075971
PCT Pub. Date: May 28, 2015

(65) Prior Publication Data
US 2016/0288570 A1 Oct. 6, 2016

(30) Foreign Application Priority Data
Nov. 19, 2013 (JP) ................................. 2013-239025

(51) Int. Cl.
| | |
|---|---|
| *C08L 31/00* | (2006.01) |
| *B60C 1/00* | (2006.01) |
| *C08F 2/38* | (2006.01) |
| *C08K 3/04* | (2006.01) |
| *C08K 3/36* | (2006.01) |
| *C08F 222/14* | (2006.01) |
| *C08F 4/34* | (2006.01) |
| *B60C 11/00* | (2006.01) |

(52) U.S. Cl.
CPC ........ *B60C 1/0016* (2013.01); *B60C 11/0008* (2013.04); *C08F 2/38* (2013.01); *C08F 4/34* (2013.01); *C08F 222/14* (2013.01); *C08K 3/04* (2013.01); *C08K 3/36* (2013.01); *Y02T 10/862* (2013.01)

(58) Field of Classification Search
CPC ..... B60C 1/0016; B60C 11/0008; C08K 3/36; C08K 3/04
USPC ........................................................ 524/559
See application file for complete search history.

(56) References Cited

U.S. PATENT DOCUMENTS

| | | | |
|---|---|---|---|
| 2002/0111418 A1* | 8/2002 | Konno | B60C 1/0016 524/572 |
| 2002/0156169 A1* | 10/2002 | Kondo | C08K 3/0033 524/432 |
| 2004/0030027 A1 | 2/2004 | Konno et al. | |
| 2014/0206809 A1* | 7/2014 | Miyazaki | C08L 7/00 524/432 |

FOREIGN PATENT DOCUMENTS

| | | |
|---|---|---|
| EP | 1 215 226 A2 | 6/2002 |
| EP | 1 500 679 A1 | 1/2005 |
| JP | 3-109449 A | 5/1991 |
| JP | 2005-68211 A | 3/2005 |
| JP | 2006-206659 A | 8/2006 |
| JP | 2008-56793 A | 3/2008 |
| JP | 2008-222891 A | 9/2008 |
| JP | 2013-53296 A | 3/2013 |

OTHER PUBLICATIONS

International Search Report issued Nov. 4, 2014 in PCT/JP2014/069935.
Runguo Wang, et al., "Itaconic acid as an alternative for synthesis rubbers" Fall 184th Technical Meeting of the Rubber Division of the America Chemical Society, Inc., Oct. 2013, pp. 174-191.
Runguo Wang, et al., "Morphology, Interfacial Interaction, and Properties of a Novel Bioelastomer Reinforced by Silica and Carbon Black" Journal of Applied Polymer Science, vol. 129, No. 3, 2013, pp. 1546-1554.

* cited by examiner

*Primary Examiner* — Hui Chin
(74) *Attorney, Agent, or Firm* — Oblon, McClelland, Maier & Neustadt, L.L.P.

(57) ABSTRACT

Provided are a rubber composition that shows a balanced improvement in fuel economy, abrasion resistance, and wet grip performance while having good processability, and a pneumatic tire including a tread formed from the rubber composition. The present invention relates to a rubber composition containing: a copolymer synthesized by copolymerization of a conjugated diene monomer and a compound represented by the formula (1) below; and carbon black and/or silica,

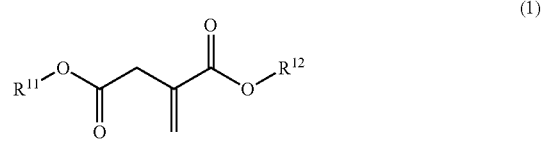

(1)

wherein $R^{11}$ and $R^{12}$ are the same as or different from each other and each represent a hydrogen atom or a C1-C30 hydrocarbon group.

22 Claims, No Drawings

RUBBER COMPOSITION AND PNEUMATIC TIRE HAVING TREAD FABRICATED USING RUBBER COMPOSITION

TECHNICAL FIELD

The present invention relates to a rubber composition and a pneumatic tire including a tread formed from the rubber composition.

BACKGROUND ART

Tire treads need to be provided with high levels of properties, such as mainly high fuel economy, high abrasion resistance and high wet grip performance, and various methods for improving these properties have been considered.

For example, fuel economy is known to be improved by introducing a functional group having an affinity for filler into the polymer chain end; abrasion resistance is known to be improved by using a high molecular weight polymer having a molecular weight of 250,000 or more; and wet grip performance is known to be improved by using a polymer having a high glass transition temperature (Tg).

However, the method of introducing a functional group having an affinity for filler, the method of using a high molecular weight polymer, and the method of using a polymer having a high Tg obtained by increasing the styrene content all lead to a problem of increasing the hardness of rubber compositions and deteriorating the processability.

Patent Literature 1 discloses a tire rubber composition having fuel economy, abrasion resistance, and wet grip performance that are improved by incorporation of a liquid resin having a softening point of −20° C. to 45° C. and a certain silica. However, there is still room for improvement in achieving a balanced improvement in these properties while providing good processability.

CITATION LIST

Patent Literature

Patent Literature 1: JP 2013-053296 A

SUMMARY OF INVENTION

Technical Problem

The present invention aims to solve the problem and provide a rubber composition that shows a balanced improvement in fuel economy, abrasion resistance, and wet grip performance while having good processability, and a pneumatic tire including a tread formed from the rubber composition.

Solution to Problem

The present invention relates to a rubber composition, including: a copolymer synthesized by copolymerization of a conjugated diene monomer and a compound represented by the formula (1) below; and at least one of carbon black or silica,

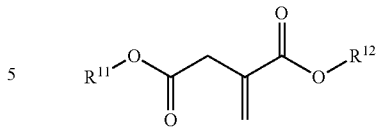

(1)

wherein $R^{11}$ and $R^{12}$ are the same as or different from each other and each represent a hydrogen atom or a C1-C30 hydrocarbon group.

The copolymer preferably contains 5% to 95% by mass of units derived from the conjugated diene monomer and 5% to 95% by mass of units derived from the compound represented by formula (1), per 100% by mass of structural units of the copolymer.

Preferably, the copolymer is synthesized by emulsion polymerization, and the copolymer has a weight average molecular weight of 5,000 to 2,000,000 and a molecular weight distribution of 2.1 to 11.

$R^{11}$ and $R^{12}$ are preferably ethyl groups.

The conjugated diene monomer is preferably 1,3-butadiene.

Preferably, the copolymer is synthesized by further emulsion polymerizing a compound represented by the formula (2) below, and the copolymer contains 1% to 50% by mass of units derived from this comonomer per 100% by mass of structural units of the copolymer,

(2)

wherein $R^{21}$ represents a hydrogen atom, a C1-C3 aliphatic hydrocarbon group, a C3-C8 alicyclic hydrocarbon group, or a C6-C10 aromatic hydrocarbon group, and $R^{22}$ represents a hydrogen atom or a methyl group.

The copolymer is preferably synthesized using as a chain transfer agent a compound that contains a mercapto group and a functional group having an affinity for filler.

The present invention also relates to a pneumatic tire, including a tread formed from the rubber composition.

Advantageous Effects of Invention

Since the rubber composition of the present invention contains a copolymer synthesized by copolymerization of a conjugated diene monomer and a compound represented by the above formula (1), and carbon black and/or silica, such a rubber composition can be used to provide a pneumatic tire including a tread that shows a balanced improvement in fuel economy, abrasion resistance, and wet grip performance while having good processability.

DESCRIPTION OF EMBODIMENTS

The rubber composition of the present invention contains a copolymer synthesized by copolymerization of a conjugated diene monomer and a compound represented by the above formula (1), and carbon black and/or silica. When the copolymer formed by copolymerizing a conjugated diene monomer and further a compound represented by the formula (1) as monomers is used with carbon black and silica, a balanced improvement in fuel economy, abrasion resistance, and wet grip performance can be achieved while imparting good processability to the unvulcanized rubber composition. Thus, a rubber composition that is excellent in the balance of these properties can be provided.

The rubber composition of the present invention contains a copolymer synthesized by copolymerization of a conjugated diene monomer and a compound represented by the above formula (1), and carbon black and/or silica.

The structural units of the copolymer include monomer units derived from a conjugated diene monomer. Examples of the conjugated diene monomer include 1,3-butadiene, isoprene, and 2,3-dimethyl-1,3-butadiene. In view of fuel economy, abrasion resistance, and wet grip performance, preferred among these is 1,3-butadiene or isoprene, with 1,3-butadiene being more preferred. These monomers may be used alone, or two or more of these may be used in combination.

In the copolymer, the amount of units derived from the conjugated diene monomer per 100% by mass of the structural units of the copolymer is preferably 5% by mass or more, more preferably 30% by mass or more, still more preferably 50% by mass or more, while it is preferably 95% by mass or less, more preferably 90% by mass or less, still more preferably 80% by mass or less. If the amount is less than 5% by mass, abrasion resistance may be reduced. If the amount is more than 95% by mass, fuel economy may be reduced.

The structural units of the copolymer include monomer units derived from a compound represented by the following formula (1):

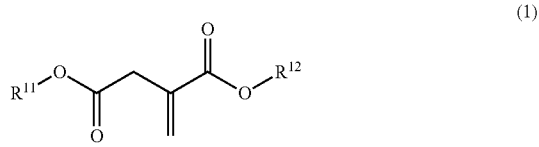

(1)

wherein $R^{11}$ and $R^{12}$ are the same as or different from each other and each represent a hydrogen atom or a C1-C30 hydrocarbon group.

The hydrocarbon group for $R^{11}$ and $R^{12}$ may be linear, branched, or cyclic groups, and examples include aliphatic hydrocarbon groups, alicyclic hydrocarbons groups, and aromatic hydrocarbon groups. Preferred among these are aliphatic hydrocarbon groups. The number of carbon atoms in the hydrocarbon group is preferably 1 to 20, more preferably 1 to 10.

The aliphatic hydrocarbon group for $R^{11}$ and $R^{12}$ is preferably a C1-C20, more preferably C1-C10, aliphatic hydrocarbon group. Preferred examples include alkyl groups, such as, specifically, methyl, ethyl, n-propyl, iso-propyl, n-butyl, iso-butyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups. Among these, a methyl or ethyl group is preferred because they contribute to significantly improving the balance of fuel economy, abrasion resistance, and wet grip performance while providing good processability. An ethyl group is more preferred.

The alicyclic hydrocarbon group is preferably a C3-C8 alicyclic hydrocarbon group, and specific examples include cyclopropyl, cyclobutyl, cyclopentyl, cyclohexyl, cycloheptyl, cyclooctyl, cyclopropenyl, cyclobutenyl, cyclopentenyl, cyclohexenyl, cycloheptenyl, and cyclooctenyl groups.

The aromatic hydrocarbon group is preferably a C6-C10 aromatic hydrocarbon group, and specific examples include phenyl, benzyl, phenethyl, tolyl, xylyl, and naphthyl groups. The tolyl or xylyl group may have a methyl substituent(s) at any position, ortho, meta, or para, on the benzene ring.

Specific examples of the compound represented by formula (1) include itaconic acid, 1-methyl itaconate, 4-methyl itaconate, dimethyl itaconate, 1-ethyl itaconate, 4-ethyl itaconate, diethyl itaconate, 1-propyl itaconate, 4-propyl itaconate, dipropyl itaconate, 1-butyl itaconate, 4-butyl itaconate, dibutyl itaconate, and 1-ethyl-4-methyl itaconate. Among these, diethyl itaconate, dibutyl itaconate, and 1-propyl itaconate are preferred because they contribute to significantly improving the balance of fuel economy, abrasion resistance, and wet grip performance while providing good processability. Diethyl itaconate is more preferred. These compounds may be used alone, or two or more of these may be used in combination.

In the copolymer, the amount of units derived from the compound represented by formula (1) per 100% by mass of the structural units of the copolymer is preferably 5% by mass or more, more preferably 8% by mass or more, still more preferably 10% by mass or more, while it is preferably 95% by mass or less, more preferably 50% by mass or less, still more preferably 40% by mass or less. If the amount is less than 5% by mass, fuel economy may be reduced. If the amount is more than 95% by mass, abrasion resistance may be reduced.

The structural units of the copolymer preferably include monomer units derived from a compound represented by the formula (2) below. When the copolymer contains monomer units derived from the compound represented by formula (2) (preferably styrene), in addition to the above structural units, wet grip performance and abrasion resistance can be more significantly improved, and the balance of fuel economy, abrasion resistance, and wet grip performance can be more significantly improved while providing good processability.

(2)

In the formula (2), $R^{21}$ represents a hydrogen atom, a C1-C3 aliphatic hydrocarbon group, a C3-C8 alicyclic hydrocarbon group, or a C6-C10 aromatic hydrocarbon group, and $R^{22}$ represents a hydrogen atom or a methyl group.

Examples of the C1-C3 aliphatic hydrocarbon group in the compound represented by formula (2) include C1-C3 alkyl groups such as methyl, ethyl, n-propyl, and isopropyl groups. Preferred among these is a methyl group.

Examples of the C3-C8 alicyclic hydrocarbon group in the compound represented by formula (2) include those as described for the compound represented by formula (1).

Examples of the C6-C10 aromatic hydrocarbon group in the compound represented by formula (2) include those as described for the compound represented by formula (1). Among these, phenyl, tolyl, and naphthyl groups are preferred because of their high reactivity. A phenyl group is more preferred.

$R^{21}$ is preferably a C6-C10 aromatic hydrocarbon group. $R^{22}$ is preferably a hydrogen atom.

Examples of the compound represented by formula (2) include styrene, 2-methylstyrene, 3-methylstyrene, 4-methylstyrene, α-methylstyrene, 2,4-dimethylstyrene, vinylethylbenzene, α-vinylnaphthalene, β-vinylnaphthalene, and vinylxylene. Among these, styrene, α-methylstyrene, α-vinylnaphthalene, and β-vinylnaphthalene are preferred because of their high reactivity. Styrene is more preferred.

In the copolymer, the amount of units derived from the compound represented by formula (2) per 100% by mass of the structural units of the copolymer is preferably 1% by mass or more, more preferably 5% by mass or more, still more preferably 10% by mass or more, while it is preferably 50% by mass or less, more preferably 30% by mass or less, still more preferably 20% by mass or less. When the amount falls within the above range, the effects of the present invention can be sufficiently achieved.

In the copolymer, the combined amount of units derived from the compound represented by formula (1) and the compound represented by formula (2), per 100% by mass of the structural units of the copolymer, is preferably 5% by mass or more, more preferably 8% by mass or more, still more preferably 10% by mass or more, particularly preferably 15% by mass or more, while it is preferably 95% by mass or less, more preferably 70% by mass or less, still more preferably 50% by mass or less, particularly preferably 40% by mass or less, most preferably 30% by mass or less. When the combined amount falls within the above range, the effects of the present invention can be sufficiently achieved.

In the copolymer, the amount of units derived from the conjugated diene monomer, and the amounts of units derived from the compound represented by formula (1) or (2) and other monomer units can be measured by NMR (from Bruker).

The copolymer may be produced by any copolymerization method, such as solution polymerization, emulsion polymerization, gas phase polymerization, or bulk polymerization, with emulsion polymerization being preferred because it produces a high yield of the copolymer.

In the case of emulsion polymerization, the copolymer can be synthesized by known emulsion polymerization methods. For example, the copolymer can be more suitably produced by a method including the steps of: emulsifying the monomers which constitute the copolymer, i.e., the diene monomer and the compound represented by formula (1), and optionally the compound represented by formula (2), in water using an emulsifier; and adding a free radical initiator to the resulting emulsion to cause free radical polymerization.

The emulsion can be prepared by known emulsification methods using emulsifiers. The emulsifier is not particularly limited, and may be any known material, such as fatty acid salts or rosin acid salts. Examples of fatty acid salts and rosin acid salts include potassium or sodium salts of capric acid, lauric acid, myristic acid, and the like.

The emulsion polymerization can be carried out by known methods using free radical polymerization initiators. The free radical polymerization initiator is not particularly limited, and may be any known material. Examples include redox initiators such as paramenthane hydroperoxide and persulfates such as ammonium persulfate.

The temperature of emulsion polymerization may be appropriately adjusted according to the type of free radical initiator used, and it ranges preferably from −30° C. to 50° C., more preferably from −10° C. to 20° C.

The emulsion polymerization can be stopped by adding a polymerization terminator to the polymerization system. The polymerization terminator is not particularly limited, and may be any known material, such as N,N'-dimethyldithiocarbamate, diethylhydroxylamine, or hydroquinone.

The copolymer in the present invention is preferably prepared by emulsion polymerization in the presence of a chain transfer agent. The thus produced copolymer further improves processability, fuel economy, and abrasion resistance.

The chain transfer agent refers to an agent for controlling free radical polymerization that can act on the growing polymer chain end to terminate the polymer growth while generating a new polymerization-initiating radical. This agent enables control of the molecular weight and molecular weight distribution of the polymer (decrease in molecular weight and narrowing of molecular weight distribution), control of the polymer chain end structure, and the like.

Examples of the chain transfer agent include n-octyl mercaptan, n-nonyl mercaptan, n-decyl mercaptan, n-dodecyl mercaptan, t-dodecyl mercaptan, and n-hexadecyl mercaptan, with t-dodecyl mercaptan being preferred as it can easily control the molecular weight.

The chain transfer agent may suitably be a compound that contains a mercapto group and a functional group having an affinity for filler. When the compound that contains a mercapto group and further a functional group having an affinity for filler is used as the chain transfer agent, the functional group having an affinity for filler can be introduced into the polymer chain end, thereby more significantly improving fuel economy and abrasion resistance. Examples of the functional group having an affinity for filler include amino, amide, alkoxysilyl, isocyanate, imino, imidazole, urea, ester, ether, carbonyl, carboxyl, hydroxyl, nitrile, and pyridyl groups. Preferred among these are alkoxysilyl and ester groups, with alkoxysilyl groups being more preferred. Here, the filler refers to reinforcing filler such as carbon black or silica.

The compound containing an ester group may suitably be, for example, methyl 3-mercaptopropionate, ethyl 3-mercaptopropionate, propyl 3-mercaptopropionate, butyl 3-mercaptopropionate, pentyl 3-mercaptopropionate, hexyl 3-mercaptopropionate, heptyl 3-mercaptopropionate, octyl 3-mercaptopropionate, 2-ethylhexyl 3-mercaptopropionate, 2-ethylhexyl mercaptoethanoate, 2-mercaptoethyl methanoate, 2-mercaptoethyl ethanoate, 2-mercaptoethyl propionate, 2-mercaptoethyl butanoate, 2-mercaptoethyl pentanoate, 2-mercaptoethyl hexanoate, 2-mercaptoethyl heptanoate, 2-mercaptoethyl octanoate, or 2-mercaptomethyl octanoate, with 2-ethylhexyl 3-mercaptopropionate or 2-mercaptoethyl octanoate being preferred among these.

The compound containing an alkoxysilyl group may suitably be a compound represented by the formula (3) below. With such a compound, fuel economy and abrasion resistance can be more significantly improved.

$$R^{32}-\underset{\underset{R^{33}}{|}}{\overset{\overset{R^{31}}{|}}{Si}}-R^{34}-SH \quad (3)$$

In the formula (3), $R^{31}$ to $R^{33}$ each represent a branched or unbranched C1-C12 alkyl group, a branched or unbranched C1-C12 alkoxy group, or a group represented by —O—$(R^{35}$—O$)_z$—$R^{36}$ where each of the $R^{35}$ groups, whose number is z, represents a branched or unbranched divalent C1-C30 hydrocarbon group and may be the same as or different from one another, $R^{36}$ represents a branched or unbranched C1-C30 alkyl group, a branched or unbranched C2-C30 alkenyl group, a C6-C30 aryl group, or a C7-C30 aralkyl group, and z represents an integer of 1 to 30, provided that at least one of the $R^{31}$ to $R^{33}$ groups is a branched or unbranched C1-C12 alkoxy group, and $R^{31}$ to $R^{33}$ may be the same as or different from one another; and $R^{34}$ represents a branched or unbranched C1-C6 alkylene group.

$R^{31}$ to $R^{33}$ each represent a branched or unbranched C1-C12 alkyl group, a branched or unbranched C1-C12 alkoxy group, or a group represented by —O—$(R^{35}$—O$)_z$—$R^{36}$, and at least one of the $R^{31}$ to $R^{33}$ groups is a branched or unbranched C1-C12 alkoxy group.

Further, at least one of the $R^{31}$ to $R^{33}$ groups is preferably a group represented by —O—$(R^{35}$—O$)_z$—$R^{36}$ because the effects of the present invention can be better achieved. More preferably, the other two of $R^{31}$ to $R^{33}$ are groups represented by —O—$(R^{35}$—O$)_z$—$R^{36}$.

Also preferably, all of $R^{31}$ to $R^{33}$ are branched or unbranched C1-C12, preferably C1-C5, more preferably C1-C3 alkoxy groups.

Examples of the branched or unbranched C1-C12, preferably C1-C5, alkyl group for $R^{31}$ to $R^{33}$ include methyl, ethyl, n-propyl, isopropyl, n-butyl, iso-butyl, sec-butyl, tert-butyl, pentyl, hexyl, heptyl, 2-ethylhexyl, octyl, and nonyl groups.

Examples of the branched or unbranched C1-C12, preferably C1-C5, more preferably C1-C3, alkoxy group for $R^{31}$ to $R^{33}$ include methoxy, ethoxy, n-propoxy, isopropoxy, n-butoxy, iso-butoxy, sec-butoxy, tert-butoxy, pentyloxy, hexyloxy, heptyloxy, 2-ethylhexyloxy, octyloxy, and nonyloxy groups.

In the group: —O—$(R^{35}$—O$)_z$—$R^{36}$ for $R^{31}$ to $R^{33}$, $R^{35}$ represents a branched or unbranched divalent C1-C30, preferably C1-C15, more preferably C1-C3 hydrocarbon group.

Examples of the hydrocarbon group include branched or unbranched C1-C30 alkylene groups, branched or unbranched C2-C30 alkenylene groups, branched or unbranched C2-C30 alkynylene groups, and C6-C30 arylene groups, with branched or unbranched C1-C30 alkylene groups being preferred among these.

Examples of branched or unbranched C1-C30, preferably C1-C15, more preferably C1-C3 alkylene groups for $R^{35}$ include methylene, ethylene, propylene, butylene, pentylene, hexylene, heptylene, octylene, nonylene, decylene, undecylene, dodecylene, tridecylene, tetradecylene, pentadecylene, hexadecylene, heptadecylene, and octadecylene groups.

Examples of branched or unbranched C2-C30, preferably C2-C15, more preferably C2-C3 alkenylene groups for $R^{35}$ include vinylene, 1-propenylene, 2-propenylene, 1-butenylene, 2-butenylene, 1-pentenylene, 2-pentenylene, 1-hexenylene, 2-hexenylene, and 1-octenylene groups.

Examples of branched or unbranched C2-C30, preferably C2-C15, more preferably C2-C3 alkynylene groups for $R^{35}$ include ethynylene, propynylene, butynylene, pentynylene, hexynylene, heptynylene, octynylene, nonynylene, decynylene, undecynylene, and dodecynylene groups.

Examples of C6-C30, preferably C6-C15 arylene groups for $R^{35}$ include phenylene, tolylene, xylylene, and naphthylene groups.

The symbol z represents an integer of 1 to 30, preferably of 2 to 20, more preferably of 3 to 7, still more preferably of 5 to 6.

$R^{36}$ represents a branched or unbranched C1-C30 alkyl group, a branched or unbranched C2-C30 alkenyl group, a C6-C30 aryl group, or a C7-C30 aralkyl group. Among these, $R^{36}$ is preferably a branched or unbranched C1-C30 alkyl group.

Examples of the branched or unbranched C1-C30, preferably C3-C25, more preferably C10-C15, alkyl group for $R^{36}$ include methyl, ethyl, n-propyl, isopropyl, n-butyl, isobutyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups.

Examples of the branched or unbranched C2-C30, preferably C3-C25, more preferably C10-C15, alkenyl group for $R^{36}$ include vinyl, 1-propenyl, 2-propenyl, 1-butenyl, 2-butenyl, 1-pentenyl, 2-pentenyl, 1-hexenyl, 2-hexenyl, 1-octenyl, decenyl, undecenyl, dodecenyl, tridecenyl, tetradecenyl, pentadecenyl, and octadecenyl groups.

Examples of the C6-C30, preferably C10-C20, aryl group for $R^{36}$ include phenyl, tolyl, xylyl, naphthyl, and biphenyl groups.

Examples of the C7-C30, preferably C10-C20, aralkyl group for $R^{36}$ include benzyl and phenethyl groups.

Specific examples of the group represented by —O—$(R^{35}$—O$)_z$—$R^{36}$ include —O—$(C_2H_4$—O$)_5$—$C_{11}H_{23}$, —O—$(C_2H_4$—O$)_5$—$C_{12}H_{25}$, —O—$(C_2H_4$—O$)_5$—$C_{13}H_{27}$, —O—$(C_2H_4$—O$)_5$—$C_{14}H_{29}$, —O—$(C_2H_4$—O$)_5$—$C_{15}H_{31}$, —O—$(C_2H_4$—O$)_3$—$C_{13}H_{27}$, —O—$(C_2H_4$—O$)_4$—$(C_{13}H_{27}$, —O—$(C_2H_4$—O$)_6$—$C_{13}H_{27}$, and —O—$(C_2H_4$—O$)_7$—$C_{13}H_{27}$. Preferred among these are —O—$(C_2H_4$—O$)_5$—$C_{11}H_{23}$, —O—$(C_2H_4$—O$)_5$—$C_{13}H_{27}$, —O—$(C_2H_4$—O$)_5$—$C_{15}H_{31}$, and —O—$(C_2H_4$—O$)_6$—$C_{13}H_{27}$.

Examples of the branched or unbranched C1-C6, preferably C1-C5, alkylene group for $R^{34}$ include those as described for the branched or unbranched C1-C30 alkylene group for $R^{35}$.

Examples of the compound represented by formula (3) include 3-mercaptopropyltrimethoxysilane, 3-mercaptopropyltriethoxysilane, 2-mercaptoethyltrimethoxysilane, 2-mercaptoethyltriethoxysilane, and a compound (Si363 available from EVONIK-DEGUSSA) represented by the formula below, with 3-mercaptopropyltriethoxysilane or the compound represented by the formula below being suitable because the effects of the present invention can be better achieved. More suitable is the compound represented by the formula below. These compounds may be used alone, or two or more of these may be used in combination.

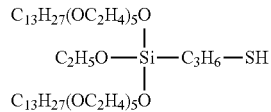

The weight average molecular weight (Mw) of the copolymer is preferably 5,000 or more, more preferably 50,000 or more, still more preferably 100,000 or more, particularly preferably 300,000 or more, most preferably 450,000 or more, while it is preferably 2,000,000 or less, more preferably 1,500,000 or less, still more preferably 1,000,000 or less. If the Mw is less than 5,000, fuel economy and abrasion resistance may deteriorate. If the Mw is more than 2,000,000, processability may deteriorate.

The ratio of the Mw to the number average molecular weight (Mn) of the copolymer, that is, the molecular weight distribution (Mw/Mn), is preferably 2.1 or more, more preferably 2.5 or more, still more preferably 3.0 or more, while it is preferably 11 or less, more preferably 8 or less, still more preferably 5 or less. If the Mw/Mn is less than 2.1, processability may deteriorate. If the Mw/Mn is more than 11, fuel economy may deteriorate.

The Mw and Mn values are determined relative to polystyrene standards using a gel permeation chromatograph (GPC).

The copolymer preferably has a glass transition temperature (Tg) of −100° C. to 100° C., more preferably −70° C. to 0° C. When the Tg falls within the above range, the effects of the present invention can be sufficiently achieved.

The Tg values are measured with a differential scanning calorimeter (Q200) available from TA Instruments, Japan at a temperature increase rate of 10° C./min in accordance with JIS K 7121:1987.

The copolymer preferably has a Mooney viscosity, $ML_{1+4}$, at 130° C. of 30 to 100, more preferably 40 to 80. When the $ML_{1+4}$ falls within the above range, the effects of the present invention can be sufficiently achieved.

The Mooney viscosity ($ML_{1+4}$, 130° C.) values are determined by measuring Mooney viscosity at 130° C. in accordance with JIS K 6300.

The amount of the copolymer per 100% by mass of the rubber component is preferably 1% by mass or more, more preferably 50% by mass or more, still more preferably 70% by mass or more, particularly preferably 80% by mass or more, and may be 100% by mass. An amount of less than 1% by mass may be too small to achieve the effects of the present invention.

Examples of other rubber materials that can be used in combination with the copolymer as the rubber component in the present invention include diene rubbers such as natural rubber (NR), polyisoprene rubber (IR), polybutadiene rubber (BR), styrene-butadiene rubber (SBR), styrene-isoprene rubber (SIR), styrene-isoprene-butadiene rubber (SIBR), ethylene-propylene-diene rubber (EPDM), chloroprene rubber (CR), acrylonitrile-butadiene rubber (NBR), and butyl rubber (IIR). These diene rubbers may be used alone, or two or more of these may be used in combination.

The rubber composition of the present invention contains carbon black and/or silica as filler.

The carbon black may be one commonly used in tire production, and examples include SAF, ISAF, HAF, FF, FEF, and GPF. These carbon blacks may be used alone, or two or more of these may be used in combination.

The carbon black preferably has a nitrogen adsorption specific surface area ($N_2SA$) of 80 $m^2/g$ or more, more preferably 100 $m^2/g$ or more, but preferably 200 $m^2/g$ or less, more preferably 150 $m^2/g$ or less. If the carbon black has a $N_2SA$ of less than 80 $m^2/g$, it tend to provide low reinforcing properties and thus fail to sufficiently improve abrasion resistance. If the carbon black has a $N_2SA$ of more than 200 $m^2/g$, it tends to be poorly dispersed, thereby resulting in deterioration of fuel economy.

The $N_2SA$ of carbon black can be measured in accordance with JIS K 6217-2:2001.

The carbon black preferably has a dibutyl phthalate oil absorption (DBP) of 50 ml/100 g or more, more preferably 100 ml/100 g or more, but preferably 200 ml/100 g or less, or 150 ml/100 g or less. If the carbon black has a DBP of less than 50 ml/100 g, it may fail to provide sufficient reinforcing properties, thereby resulting in a decrease in abrasion resistance. If the carbon black has a DBP of more than 200 ml/100 g, it may have reduced dispersibility, thereby resulting in deterioration of fuel economy.

The DBP of carbon black can be measured in accordance with JIS K 6217-4:2001.

The amount of carbon black per 100 parts by mass of the rubber component is preferably 1 part by mass or more, more preferably 3 parts by mass or more, while it is preferably 50 parts by mass or less, or 30 parts by mass or less. If the amount is less than 1 part by mass, abrasion resistance may deteriorate. If the amount is more than 50 parts by mass, fuel economy may deteriorate.

Examples of the silica include, but are not limited to, dry silica (anhydrous silicic acid) and wet silica (hydrous silicic acid). Wet silica is preferred for the reason that it has a large number of silanol groups.

The silica preferably has a $N_2SA$ of 100 $m^2/g$ or more, more preferably 150 $m^2/g$ or more, but preferably 300 $m^2/g$ or less, more preferably 200 $m^2/g$ or less. If the silica has a $N_2SA$ of less than 100 $m^2/g$, it tends to produce a small reinforcing effect and thus fail to sufficiently improve abrasion resistance. If the silica has a $N_2SA$ of more than 300 $m^2/g$, it tends to be poorly dispersed, thereby resulting in deterioration of fuel economy.

The $N_2SA$ of silica can be measured in accordance with ASTM D3037-81.

The amount of silica per 100 parts by mass of the rubber component is preferably 1 part by mass or more, more preferably 10 parts by mass or more, while it is preferably 150 parts by mass or less, more preferably 100 parts by mass or less. If the amount is less than 1 part by mass, sufficient fuel economy and sufficient abrasion resistance tend not to be obtained. If the amount is more than 150 parts by mass, the silica tends to have deteriorated dispersibility, thereby resulting in deterioration of processability.

The rubber composition of the present invention preferably contains a silane coupling agent together with the silica.

The silane coupling agent may be any silane coupling agent conventionally used in combination with silica in the rubber industry. Examples include sulfide silane coupling agents such as bis(3-triethoxysilylpropyl)tetrasulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Preferred among these are sulfide silane coupling agents, with bis(3-triethoxysilylpropyl)tetrasulfide being more preferred.

When a silane coupling agent is contained, the amount of silane coupling agent per 100 parts by mass of silica is preferably 1 part by mass or more, more preferably 2 parts by mass or more, while it is preferably 20 parts by mass or less, more preferably 15 parts by mass or less. If the amount is less than 1 part by mass, the effect of improving dispersibility and the like tend not to be sufficiently achieved. If the amount is more than 20 parts by mass, the coupling effect tends to be insufficient, thereby resulting in a decrease in reinforcing properties.

The rubber composition of the present invention may optionally incorporate compounding agents conventionally used in the rubber industry, in addition to the components described above. Examples include other reinforcing fillers, antioxidants, oils, waxes, vulcanizing agents such as sulfur, and vulcanization accelerators.

The rubber composition of the present invention can be used in treads (cap treads, base treads), base treads, sidewalls and other components of tires and, in particular, is suitable for treads, and especially for cap treads.

The pneumatic tire of the present invention can be produced from the above-described rubber composition by usual methods.

Specifically, the rubber composition containing the components described above, before vulcanization, is extruded and processed into the shape of a tire component, e.g. a tread, and assembled with other tire components on a tire building machine in a usual manner to build an unvulcanized tire. The unvulcanized tire is heated and pressurized in a vulcanizer to provide a tire.

The pneumatic tire of the present invention is suitable for passenger vehicles, large passenger vehicles, large SUVs, heavy load vehicles such as trucks and buses, and light trucks, and usable as a winter tire or studless winter tire in these vehicles.

EXAMPLES

The present invention is specifically described with reference to examples but is not limited thereto.

The chemicals used in production examples are listed below.

Ion-exchanged water: In-house product

Potassium rosinate soap: available from Harima Chemicals Group, Inc.

Fatty acid sodium soap: available from Wako Pure Chemical Industries, Ltd.

Potassium chloride: available from Wako Pure Chemical Industries, Ltd.

Sodium naphthalenesulfonate-formaldehyde condensate: available from Kao Corporation Styrene: Styrene available from Wako Pure Chemical Industries, Ltd.

1,3-Butadiene: 1,3-Butadiene available from Takachiho Trading Co., Ltd.

t-Dodecyl mercaptan: tert-Dodecyl mercaptan available from Wako Pure Chemical Industries, Ltd. (chain transfer agent)

Si363: 3-[Ethoxybis(3,6,9,12,15-pentaoxaoctacosan-1-yloxy)silyl]-1-propanethiol available from Degussa (chain transfer agent, a compound represented by the formula below)

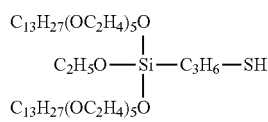

2-Ethylhexyl 3-mercaptopropionate: available from Tokyo Chemical Industry Co., Ltd. (chain transfer agent)

2-Mercaptoethyl octanoate: available from Tokyo Chemical Industry Co., Ltd. (chain transfer agent)

3-Mercaptopropyltriethoxysilane: available from Tokyo Chemical Industry Co., Ltd. (chain transfer agent, a compound represented by formula (3))

Sodium hydrosulfide: available from Wako Pure Chemical Industries, Ltd.

$FeSO_4$: Ferric sulfate available from Wako Pure Chemical Industries, Ltd.

EDTA: Sodium ethylenediaminetetraacetate available from Wako Pure Chemical Industries, Ltd.

Rongalite: Sodium formaldehyde sulfoxylate available from Wako Pure Chemical Industries, Ltd.

Polymerization initiator: Paramenthane hydroperoxide available from NOF Corporation Polymerization terminator: N,N-Diethylhydroxylamine available from Wako Pure Chemical Industries, Ltd.

2,6-Di-t-butyl-p-cresol: Sumilizer BHT available from Sumitomo Chemical Co., Ltd.

Diethyl itaconate (IDE): available from Tokyo Chemical Industry Co., Ltd.

Dibutyl itaconate (IDB): available from Tokyo Chemical Industry Co., Ltd.

(Preparation of Emulsifier)

An emulsifier was prepared by adding 9,356 g of ion-exchanged water, 1,152 g of potassium rosinate soap, 331 g of fatty acid sodium soap, 51 g of potassium chloride, and 30 g of sodium naphthalenesulfonate-formaldehyde condensate, followed by stirring at 70° C. for 2 hours.

Production Example 1

A 50 L (interior volume) stainless-steel polymerization reactor was cleaned, dried, and purged with dry nitrogen. Then, the reactor was charged with 3,500 g of 1,3-butadiene, 1,500 g of styrene, 5.74 g of t-dodecyl mercaptan, 9,688 g of the emulsifier, 6.3 ml of sodium hydrosulfide (1.8 M), 6.3 ml each of the activators ($FeSO_4$/EDTA/Rongalite), and 6.3 ml of the polymerization initiator (2.3 M), followed by polymerization at 10° C. for 3 hours with stirring. After the completion of the polymerization, 2.9 g of N,N-diethylhydroxylamine was added to the reaction mixture and they were reacted for 30 minutes. The contents were taken out from the polymerization reactor and combined with 10 g of 2,6-di-t-butyl-p-cresol. After most of the water was evaporated off, the residue was dried under reduced pressure at 55° C. for 12 hours to give a copolymer 1.

Production Example 2

A copolymer 2 was prepared in the same manner as in Production Example 1, except that 1,500 g of diethyl itaconate (IDE) was used instead of 1,500 g of styrene.

Production Example 3

A copolymer 3 was prepared in the same manner as in Production Example 1, except that 1,500 g of dibutyl itaconate (IDB) was used instead of 1,500 g of styrene.

Production Example 4

A copolymer 4 was prepared in the same manner as in Production Example 1, except that 1,500 g of diethyl itaconate (IDE) was used instead of 1,500 g of styrene, and 6.40 g of Si363 was used instead of 5.74 g of t-dodecyl mercaptan.

Production Example 5

A copolymer 5 was prepared in the same manner as in Production Example 1, except that 750 g out of 1,500 g of styrene was replaced with 750 g of diethyl itaconate (IDE).

Production Example 6

A copolymer 6 was prepared in the same manner as in Production Example 1, except that 750 g out of 1,500 g of styrene was replaced with 750 g of diethyl itaconate (IDE), and 5.74 g of t-dodecyl mercaptan was replaced with 6.40 g of Si363.

Production Example 7

A copolymer 7 was prepared in the same manner as in Production Example 1, except that 1,500 g of diethyl itaconate (IDE) was used instead of 1,500 g of styrene, and 6.11 g of 2-ethylhexyl 3-mercaptopropionate was used instead of 5.74 g of t-dodecyl mercaptan.

Production Example 8

A copolymer 8 was prepared in the same manner as in Production Example 1, except that 750 g out of 1,500 g of styrene was replaced with diethyl itaconate (IDE), and 5.74 g of t-dodecyl mercaptan was replaced with 6.11 g of 2-ethylhexyl 3-mercaptopropionate.

Production Example 9

A copolymer 9 was prepared in the same manner as in Production Example 1, except that 1,500 g of diethyl itaconate (IDE) was used instead of 1,500 g of styrene, and 6.11 g of 2-mercaptoethyl octanoate was used instead of 5.74 g of t-dodecyl mercaptan.

Production Example 10

A copolymer 10 was prepared in the same manner as in Production Example 1, except that 750 g out of 1,500 g of styrene was replaced with diethyl itaconate (IDE), and 5.74 g of t-dodecyl mercaptan was replaced with 6.11 g of 2-mercaptoethyl octanoate.

Production Example 11

A copolymer 11 was prepared in the same manner as in Production Example 1, except that 1,500 g of styrene was replaced with diethyl itaconate (IDE), and 5.74 g of t-dodecyl mercaptan was replaced with 6.11 g of 3-mercaptopropyltriethoxysilane.

Production Example 12

A copolymer 12 was prepared in the same manner as in Production Example 1, except that 750 g out of 1,500 g of styrene was replaced with diethyl itaconate (IDE), and 5.74 g of t-dodecyl mercaptan was replaced with 6.11 g of 3-mercaptopropyltriethoxysilane.

Table 1 shows the amount of butadiene (conjugated diene monomer), the amount of diethyl itaconate or dibutyl itaconate (compound represented by formula (1)), the amount of styrene (compound represented by formula (2)), Mw, Mw/Mn, Tg, and Mooney viscosity of the copolymers 1 to 12 prepared in Production Examples 1 to 12. These values were determined as collectively described below.

(Amount of Each of Monomer Units)

A $^1$H-NMR spectrum was measured using an NMR device available from Bruker at 23° C. The ratio of the peaks from the phenyl protons of the styrene units at 6.5 to 7.2 ppm, the vinyl protons of the butadiene units at 4.9 to 5.4 ppm, and the isobutyl vinyl ether units at 3.9 to 4.2 ppm was determined based on the spectrum. Then, the amounts of the monomer units were determined from the ratio.

(Measurement of Weight Average Molecular Weight (Mw) and Number Average Molecular Weight (Mn))

The weight average molecular weight (Mw) and the number average molecular weight (Mn) of each copolymer were determined relative to polystyrene standards using a gel permeation chromatograph (GPC) (GPC-8000 series available from Tosoh Corporation, detector: differential refractometer, column: TSKGEL SUPERMULTIPORE HZ-M available from Tosoh Corporation).

(Measurement of Glass Transition Temperature (Tg))

The glass transition temperature (Tg) is defined as the glass transition onset temperature measured using a differential scanning calorimeter (Q200) available from TA Instruments, Japan at a temperature increase rate of 10° C./min in accordance with JIS K 7121.

(Mooney Viscosity ($ML_{1+4}$, 130° C.)

After preheating at 130° C. for 1 minute, each rubber was measured for Mooney viscosity ($ML_{1+4}$, 130° C.) for 4 minutes using a Mooney viscometer (SMV-200) available from Shimadzu Corporation in accordance with JIS K 6300.

TABLE 1

| | Production Example 1 | Production Example 2 | Production Example 3 | Production Example 4 | Production Example 5 | Production Example 6 | Production Example 7 |
|---|---|---|---|---|---|---|---|
| Amount of butadiene (conjugated diene monomer) (% by mass) | 76 | 76 | 76 | 76 | 76 | 76 | 76 |
| Amount of diethyl itaconate or dibutyl itaconate (formula (1)) (% by mass) | — | 24 | 24 | 24 | 12 | 12 | 24 |
| Amount of styrene (formula (2)) (% by mass) | 24 | — | — | — | 12 | 12 | — |
| Weight average molecular weight (Mw) | 510,000 | 500,000 | 495,000 | 495,000 | 520,000 | 520,000 | 490,000 |
| Molecular weight distribution (Mw/Mn) | 3.6 | 3.7 | 4.1 | 4.1 | 3.9 | 4.1 | 4.1 |
| Tg (° C.) | −51 | −48 | −55 | −45 | −42 | −38 | −46 |
| Mooney viscosity ($ML_{1+4}$, 130° C.) | 52 | 46 | 42 | 51 | 52 | 56 | 49 |

| | Production Example 8 | Production Example 9 | Production Example 10 | Production Example 11 | Production Example 12 |
|---|---|---|---|---|---|
| Amount of butadiene (conjugated diene monomer) (% by mass) | 76 | 76 | 76 | 76 | 76 |
| Amount of diethyl itaconate or dibutyl itaconate (formula (1)) (% by mass) | 12 | 24 | 12 | 24 | 12 |
| Amount of styrene (formula (2)) (% by mass) | 12 | — | 12 | — | 12 |

TABLE 1-continued

|  | | | | | |
|---|---|---|---|---|---|
| Weight average molecular weight (Mw) | 520,000 | 495,000 | 510,000 | 500,000 | 520,000 |
| Molecular weight distribution (Mw/Mn) | 4 | 4 | 3.9 | 3.8 | 3.8 |
| Tg (° C.) | −41 | −47 | −42 | −45 | −41 |
| Mooney viscosity (ML$_{1+4}$, 130° C.) | 53 | 49 | 52 | 51 | 55 |

The chemicals used in examples and comparative example were listed below.

Rubber component: Copolymers 1 to 12 prepared in Production Examples 1 to 12

Carbon black: SHOBLACK N220 (N$_2$SA: 111 m$^2$/g, DBP: 115 ml/100 g) available from Cabot Japan K.K.

Silica: ULTRASIL VN3 (N$_2$SA: 175 m$^2$/g) available from Degussa

Silane coupling agent: Si69 (bis(3-triethoxysilylpropyl) tetrasulfide) available from Degussa Zinc oxide: Zinc oxide #1 available from Mitsui Mining and Smelting Co., Ltd.

Stearic acid: Stearic acid available from NOF Corporation

Antioxidant: NOCRAC 6C (N-1,3-dimethylbutyl-N'-phenyl-p-phenylenediamine) available from Ouchi Shinko Chemical Industrial Co., Ltd.

Wax: Sunnoc Wax available from Ouchi Shinko Chemical Industrial Co., Ltd.

Vulcanization accelerator 1: Nocceler CZ (N-cyclohexyl-2-benzothiazolylsulfenamide) available from Ouchi Shinko Chemical Industrial Co., Ltd.

Vulcanization accelerator 2: Nocceler D (N,N'-diphenylguanidine) available from Ouchi Shinko Chemical Industrial Co., Ltd.

Sulfur: Sulfur powder available from Tsurumi Chemical Industry Co., Ltd.

Examples and Comparative Example

According to the formulations shown in Table 2, the chemicals other than the sulfur and vulcanization accelerators were kneaded using a Banbury mixer at 150° C. for 5 minutes. To the kneaded mixture were added the sulfur and vulcanization accelerators, and they were kneaded using an open roll mill at 170° C. for 12 minutes to prepare an unvulcanized rubber composition.

The unvulcanized rubber composition was press-vulcanized at 170° C. for 20 minutes to prepare a vulcanized rubber composition.

The unvulcanized rubber compositions and vulcanized rubber compositions thus prepared were evaluated as follows.

Table 2 shows the results.

(Processability)

Each unvulcanized rubber composition was measured for Mooney viscosity at 100° C. in accordance with JIS K 6300. A lower Mooney viscosity indicates better processability.

(Fuel Economy)

The tan δ of each vulcanized rubber composition was measured using the viscoelasticity spectrometer VES (Iwamoto Seisakusho Co., Ltd.) at a temperature of 30° C., an initial strain of 10%, and a dynamic strain of 2%. A lower tan δ indicates better fuel economy.

(Wet Grip Performance)

A viscoelastic parameter was determined for specimens prepared from each vulcanized rubber composition, using a viscoelastometer (ARES) available from Rheometric Scientific in a torsional mode. The tan δ was measured at 0° C., a frequency of 10 Hz, and a strain of 1%. A higher tan δ indicates better wet grip performance.

(Abrasion Resistance)

Using a Lambourn abrasion tester, the abrasion loss of each vulcanized rubber composition was measured at room temperature, an applied load of 1.0 kgf, and a slip ratio of 30% and expressed as an index using the equation below. A higher index indicates better abrasion resistance.

(Abrasion resistance index)=(Abrasion loss of Comparative Example 1)/(Abrasion loss in each formulation)×100

TABLE 2

| | | Comparative Example 1 | Example 1 | Example 2 | Example 3 | Example 4 | Example 5 |
|---|---|---|---|---|---|---|---|
| Formulation (parts by mass) | Copolymer 1 | 100 | | | | | |
| | Copolymer 2 | | 100 | | | | |
| | Copolymer 3 | | | 100 | | | |
| | Copolymer 4 | | | | 100 | | |
| | Copolymer 5 | | | | | 100 | |
| | Copolymer 6 | | | | | | 100 |
| | Copolymer 7 | | | | | | |
| | Copolymer 8 | | | | | | |
| | Copolymer 9 | | | | | | |
| | Copolymer 10 | | | | | | |
| | Copolymer 11 | | | | | | |
| | Copolymer 12 | | | | | | |
| | Carbon black | 5 | 5 | 5 | 5 | 5 | 5 |
| | Silica | 75 | 75 | 75 | 75 | 75 | 75 |
| | Silane coupling agent | 6 | 6 | 6 | 6 | 6 | 6 |
| | Zinc oxide | 2 | 2 | 2 | 2 | 2 | 2 |
| | Stearic acid | 2 | 2 | 2 | 2 | 2 | 2 |
| | Antioxidant | 2 | 2 | 2 | 2 | 2 | 2 |
| | Wax | 2 | 2 | 2 | 2 | 2 | 2 |
| | Vulcanization accelerator 1 | 1.5 | 1.5 | 1.5 | 1.5 | 1.5 | 1.5 |

TABLE 2-continued

| | | | | | | | |
|---|---|---|---|---|---|---|---|
| | Vulcanization accelerator 2 | 2 | 2 | 2 | 2 | 2 | 2 |
| | Sulfur | 1.5 | 1.5 | 1.5 | 1.5 | 1.5 | 1.5 |
| Evaluation | Processability (Mooney viscosity ($ML_{1+4}$ at 100° C.)) | 61 | 37 | 45 | 45 | 48 | 52 |
| | Fuel economy (30° C., tan δ) | 0.228 | 0.208 | 0.22 | 0.156 | 0.215 | 0.199 |
| | Wet grip performance (0° C., tan δ) | 0.454 | 0.619 | 0.561 | 0.602 | 0.722 | 0.712 |
| | Abrasion resistance (Lambourn test) | 100 | 130 | 110 | 152 | 150 | 171 |

| | | Example 6 | Example 7 | Example 8 | Example 9 | Example 10 | Example 11 |
|---|---|---|---|---|---|---|---|
| Formulation (parts by mass) | Copolymer 1 | | | | | | |
| | Copolymer 2 | | | | | | |
| | Copolymer 3 | | | | | | |
| | Copolymer 4 | | | | | | |
| | Copolymer 5 | | | | | | |
| | Copolymer 6 | | | | | | |
| | Copolymer 7 | 100 | | | | | |
| | Copolymer 8 | | 100 | | | | |
| | Copolymer 9 | | | 100 | | | |
| | Copolymer 10 | | | | 100 | | |
| | Copolymer 11 | | | | | 100 | |
| | Copolymer 12 | | | | | | 100 |
| | Carbon black | 5 | 5 | 5 | 5 | 5 | 5 |
| | Silica | 75 | 75 | 75 | 75 | 75 | 75 |
| | Silane coupling agent | 6 | 6 | 6 | 6 | 6 | 6 |
| | Zinc oxide | 2 | 2 | 2 | 2 | 2 | 2 |
| | Stearic acid | 2 | 2 | 2 | 2 | 2 | 2 |
| | Antioxidant | 2 | 2 | 2 | 2 | 2 | 2 |
| | Wax | 2 | 2 | 2 | 2 | 2 | 2 |
| | Vulcanization accelerator 1 | 1.5 | 1.5 | 1.5 | 1.5 | 1.5 | 1.5 |
| | Vulcanization accelerator 2 | 2 | 2 | 2 | 2 | 2 | 2 |
| | Sulfur | 1.5 | 1.5 | 1.5 | 1.5 | 1.5 | 1.5 |
| Evaluation | Processability (Mooney viscosity ($ML_{1+4}$ at 100° C.)) | 51 | 52 | 46 | 49 | 50 | 56 |
| | Fuel economy (30° C., tan δ) | 0.2 | 0.211 | 0.201 | 0.208 | 0.198 | 0.199 |
| | Wet grip performance (0° C., tan δ) | 0.571 | 0.709 | 0.571 | 0.702 | 0.598 | 0.711 |
| | Abrasion resistance (Lambourn test) | 135 | 152 | 132 | 155 | 138 | 160 |

Table 2 demonstrates that, in the examples in which each of the copolymers 2 to 12 in the present invention was contained, a balanced improvement in fuel economy, abrasion resistance, and wet grip performance was achieved while providing good processability.

The invention claimed is:

1. A pneumatic tire, comprising:
a tread comprising a rubber composition comprising a copolymer and at least one of carbon black and silica, wherein the copolymer comprises a first monomer unit derived from 1, 3-butadiene and a second monomer unit derived from a compound represented by formula (1),

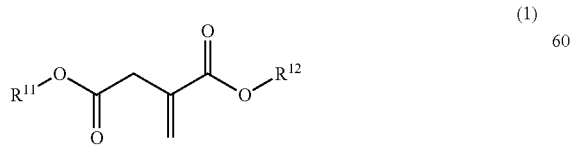
(1)

where $R^{11}$ and $R^{12}$ are the same or different from each other and each represent a hydrogen atom or a C1-C30 hydrocarbon group, and the copolymer comprises the first monomer unit in a range of 5% to 95% by mass and the second monomer unit in a range of 5% to 95% by mass per 100% by mass of structural units of the copolymer, the copolymer is produced by synthesizing the 1, 3-butadiene and the compound represented by the formula (1) by emulsion polymerization, and the copolymer has a weight average molecular weight in a range of 5,000 to 2,000,000 and a molecular weight distribution in a range of 2.1 to 11.

2. The pneumatic tire according to claim 1, wherein $R^{11}$ and $R^{12}$ are ethyl groups.

3. The pneumatic tire according to claim 1, wherein the copolymer is produced by further emulsion polymerizing a compound represented by formula (2),

(2)

where $R^{21}$ represents a hydrogen atom, a C1-C3 aliphatic hydrocarbon group, a C3-C8 alicyclic hydrocarbon group, or a C6-C10 aromatic hydrocarbon group, and $R^{22}$ represents a hydrogen atom or a methyl group, and the copolymer comprises 1% to 50% by mass of units derived from the compound represented by the formula (2) per 100% by mass of structural units of the copolymer.

4. The pneumatic tire according to claim 1, wherein the copolymer is produced by the emulsion polymerization in the presence of a chain transfer agent.

5. The pneumatic tire according to claim 1, wherein the copolymer is produced by synthesizing the 1, 3-butadiene and the compound represented by the formula (1) in the presence of a chain transfer agent comprising a compound having a mercapto group and a functional group having an affinity for filler.

6. The pneumatic tire according to claim 1, wherein the copolymer is produced by synthesizing the 1, 3-butadiene and the compound represented by the formula (1) by emulsion polymerization, and the copolymer has a glass transition temperature in a range of −100° C. to 100° C. and a Mooney viscosity $ML_{1+4}$ at 130° C. in a range of 30 to 100.

7. The pneumatic tire according to claim 2, wherein the copolymer further comprises a third monomer unit derived from a compound represented by formula (2),

(2)

where $R^{21}$ represents a hydrogen atom, a C1-C3 aliphatic hydrocarbon group, a C3-C8 alicyclic hydrocarbon group, or a C6-C10 aromatic hydrocarbon group, and $R^{22}$ represents a hydrogen atom or a methyl group, and the copolymer comprises the third monomer unit in a range of 1% to 50% by mass per 100% by mass of structural units of the copolymer.

8. A pneumatic tire, comprising:
a tread comprising a rubber composition comprising a copolymer and at least one of carbon black and silica,
wherein the copolymer comprises a first monomer unit derived from 1, 3-butadiene and a second monomer unit derived from a compound represented by formula (1),

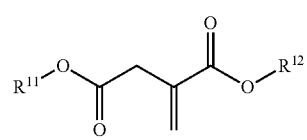
(1)

where $R^{11}$ and $R^{12}$ are the same or different from each other and each represent a hydrogen atom or a C1-C30 hydrocarbon group, and the copolymer is produced by synthesizing the 1, 3-butadiene and the compound represented by the formula (1) by emulsion polymerization, and the copolymer has a weight average molecular weight in a range of 5,000 to 2,000,000 and a molecular weight distribution in a range of 2.1 to 11.

9. The pneumatic tire according to claim 8, wherein $R^{11}$ and $R^{12}$ are ethyl groups.

10. The pneumatic tire according to claim 8, wherein the copolymer further comprises a third monomer unit derived from a compound represented by formula (2),

(2)

where $R^{21}$ represents a hydrogen atom, a C1-C3 aliphatic hydrocarbon group, a C3-C8 alicyclic hydrocarbon group, or a C6-C10 aromatic hydrocarbon group, and $R^{22}$ represents a hydrogen atom or a methyl group, and the copolymer comprises the third monomer unit in a range of 1% to 50% by mass per 100% by mass of structural units of the copolymer.

11. The pneumatic tire according to claim 8, wherein the copolymer is produced by synthesizing the 1, 3-butadiene and the compound represented by the formula (1) by emulsion polymerization in the presence of a chain transfer agent.

12. A pneumatic tire, comprising:
a tread comprising a rubber composition comprising a copolymer and at least one of carbon black and silica,
wherein the copolymer comprises a first monomer unit derived from 1, 3-butadiene and a second monomer unit derived from a compound represented by formula (1),

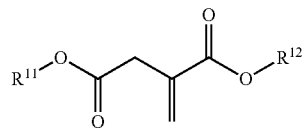
(1)

where $R^{11}$ and $R^{12}$ are ethyl groups.

13. The pneumatic tire according to claim 12, wherein the copolymer further comprises a third monomer unit derived from a compound represented by formula (2),

(2)

where $R^{21}$ represents a hydrogen atom, a C1-C3 aliphatic hydrocarbon group, a C3-C8 alicyclic hydrocarbon group, or a C6-C10 aromatic hydrocarbon group, and $R^{22}$ represents a hydrogen atom or a methyl group, and the copolymer comprises the third monomer unit in a range of 1% to 50% by mass per 100% by mass of structural units of the copolymer.

14. The pneumatic tire according to claim 12, wherein the copolymer is produced by synthesizing the 1, 3-butadiene and the compound represented by the formula (1) by emulsion polymerization in the presence of a chain transfer agent.

15. A pneumatic tire, comprising:
a tread comprising a rubber composition comprising a copolymer and at least one of carbon black and silica,
wherein the copolymer comprises a first monomer unit derived from 1, 3-butadiene and a second monomer unit derived from a compound represented by formula (1),

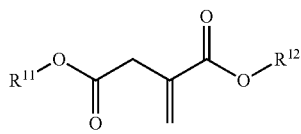

where $R^{11}$ and $R^{12}$ are the same or different from each other and each represent a hydrogen atom or a C1-C30 hydrocarbon group, and the copolymer comprises the first monomer unit in a range of 5% to 95% by mass and the second monomer unit in a range of 5% to 95% by mass per 100% by mass of structural units of the copolymer, and the copolymer has a weight average molecular weight in a range of 5,000 to 2,000,000.

16. A pneumatic tire, comprising:
a tread comprising a rubber composition comprising a copolymer and at least one of carbon black and silica, wherein the copolymer comprises a first monomer unit derived from 1, 3-butadiene and a second monomer unit derived from a compound represented by formula (1),

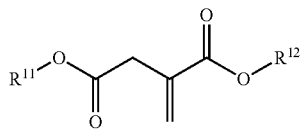

where $R^{11}$ and $R^{12}$ are the same or different from each other and each represent a hydrogen atom or a C1-C30 hydrocarbon group, and the copolymer comprises the first monomer unit in a range of 5% to 95% by mass and the second monomer unit in a range of 5% to 95% by mass per 100% by mass of structural units of the copolymer, and the copolymer has a molecular weight distribution in a range of 2.1 to 11.

17. The pneumatic tire according to claim 2, wherein the copolymer is produced by synthesizing the 1, 3-butadiene and the compound represented by the formula (1) by emulsion polymerization in the presence of a chain transfer agent.

18. The pneumatic tire according to claim 2, wherein the copolymer is produced by synthesizing the 1, 3-butadiene and the compound represented by the formula (1) in the presence of a chain transfer agent comprising a compound having a mercapto group and a functional group having an affinity for filler.

19. The pneumatic tire according to claim 2, wherein the copolymer is produced by synthesizing the 1, 3-butadiene and the compound represented by the formula (1) by emulsion polymerization, and the copolymer has a glass transition temperature in a range of −100° C. to 100° C. and a Mooney viscosity $ML_{1+4}$ at 130° C. in a range of 30 to 100.

20. The pneumatic tire according to claim 3, wherein the copolymer is produced by synthesizing the 1, 3-butadiene and the compound represented by the formula (1) by emulsion polymerization in the presence of a chain transfer agent.

21. The pneumatic tire according to claim 3, wherein the copolymer is produced by synthesizing the 1, 3-butadiene and the compound represented by the formula (1) in the presence of a chain transfer agent comprising a compound having a mercapto group and a functional group having an affinity for filler.

22. A pneumatic tire, comprising:
a tread comprising a rubber composition comprising a copolymer, carbon black and silica,
wherein the carbon black has a nitrogen adsorption specific surface area of 100 m²/g or more, the copolymer comprises a first monomer unit derived from 1, 3-butadiene and a second monomer unit derived from a compound represented by formula (1),

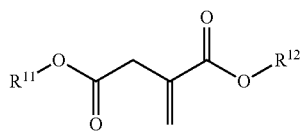

where $R^{11}$ and $R^{12}$ are the same or different from each other and each represent a hydrogen atom or a C1-C30 hydrocarbon group, and the copolymer comprises the first monomer unit in a range of 5% to 95% by mass and the second monomer unit in a range of 5% to 95% by mass per 100% by mass of structural units of the copolymer, and the copolymer has a glass transition temperature in a range of −100° C. to 100° C.

* * * * *